United States Patent [19]

Malinowski

[11] 4,022,298
[45] May 10, 1977

[54] WET DISC BRAKE

[75] Inventor: Eugene F. Malinowski, Milford, Mich.

[73] Assignee: D.A.B. Industries, Inc., Detroit, Mich.

[22] Filed: Mar. 29, 1976

[21] Appl. No.: 671,087

[52] U.S. Cl. .............................. 188/71.6; 188/167; 188/264 E; 192/70.12; 192/70.27; 192/113 B
[51] Int. Cl.² ............................................... F16D 65/84
[58] Field of Search ............... 188/71.1, 71.6, 71.8, 188/72.1, 72.6, 83, 166, 167, 170, 264 E, 271; 192/70.12, 70.27, 113 B

[56] References Cited

UNITED STATES PATENTS

| | | | |
|---|---|---|---|
| 1,673,566 | 10/1923 | Himes | 192/113 B |
| 2,496,699 | 2/1950 | Clark | 188/71.1 |
| 3,002,595 | 10/1961 | Weir | 192/113 B X |
| 3,025,686 | 3/1962 | Lewis | 192/113 B X |
| 3,198,295 | 8/1965 | Fangman et al. | 188/264 E |
| 3,366,210 | 1/1968 | Webster | 192/70.12 X |
| 3,638,773 | 2/1972 | Lewis et al. | 192/113 B X |
| 3,735,843 | 5/1973 | Wiig | 188/166 X |
| 3,897,860 | 8/1975 | Borck et al. | 188/264 E X |

*Primary Examiner*—George E. A. Halvosa
*Attorney, Agent, or Firm*—Whittemore, Hulbert & Belknap

[57] ABSTRACT

The wet disc brake comprises a stack of reaction plates interspersed between a stack of friction plates all mounted within a sealed housing. A pool of oil is provided in the bottom of the housing. The pool of oil is contacted by the rotating friction plates to coat such plates with oil. A piston is provided for pressure engagement of the discs in a braking action. Spring means are provided to apply light pressure against the piston and stack of brake discs to continually maintain these elements in non-braking engagement.

3 Claims, 7 Drawing Figures

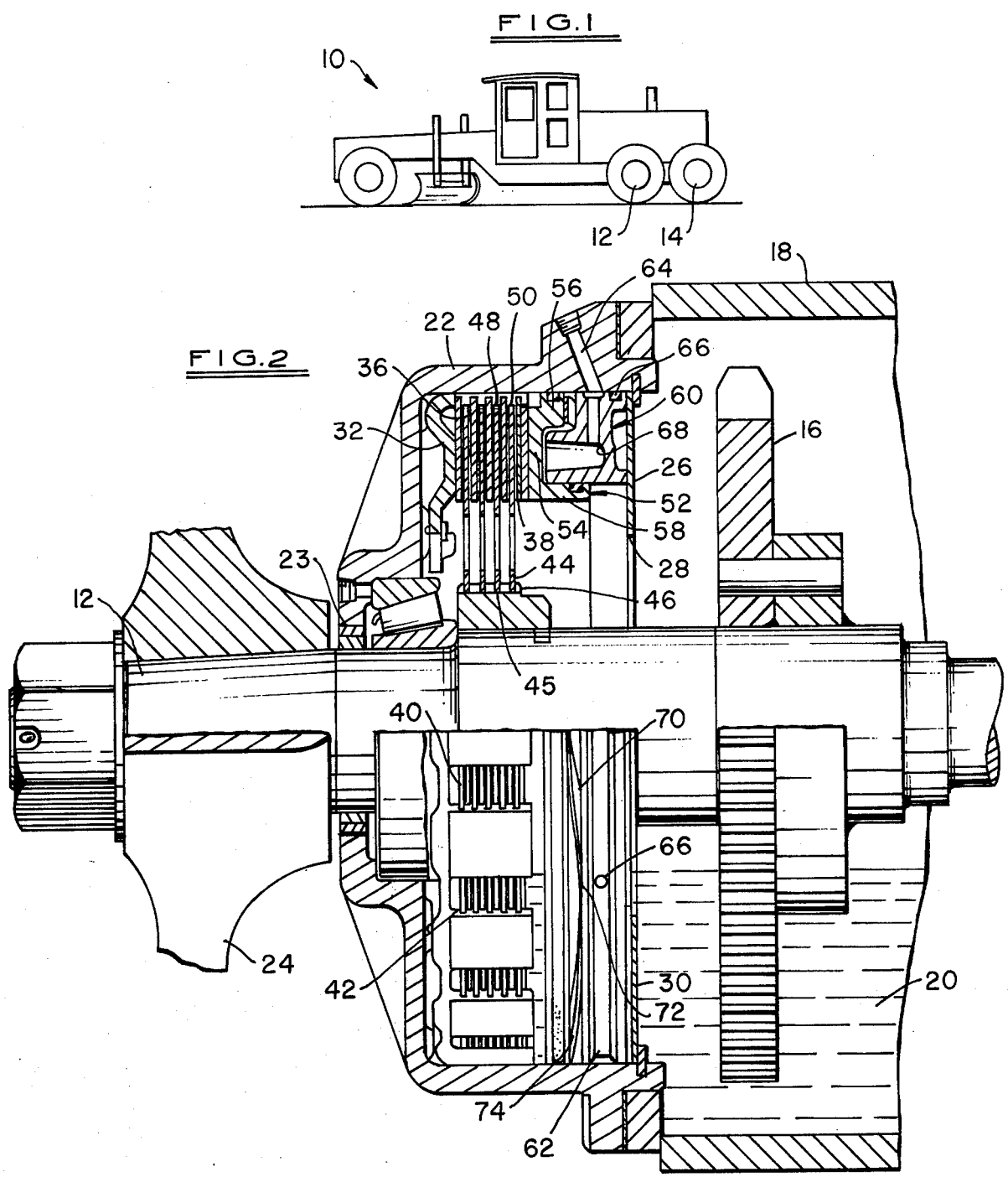

WET DISC BRAKE

BACKGROUND OF THE INVENTION

In recent years, disc-type brakes for vehicles have increasingly supplanted the previously conventional drum-type vehicle brakes. It has been proposed that disc-type brakes could be improved by constantly coating the friction material on the discs with oil. Such a brake is referred to as a "wet disc brake".

There are several advantages which may be achieved with a wet-type disc brake as opposed to a dry-type disc brake. One advantage is that by coating the friction material with oil, the coefficient of friction between the discs is more stable with a rise in temperature than is the case where the friction material is dry. As dry friction material becomes heated, the coefficient of friction between it and an engaged metal surface drops, resulting in decreasing braking effect. This phenomena is frequently referred to as "fade". Fading of braking ability may occur upon continued actuation of a brake.

Another advantage to be gained by a wet disc brake is that the friction material will not wear out as fast as is the case where the friction material is dry. This results in a longer lasting brake. A further advantage of such brakes is that they are, of necessity, enclosed in a sealed housing. The friction material generally includes asbestos fiber. As these fibers break away during wear of the friction material, they may float in the air and escape to the ambient atmosphere as is the case with the standard dry friction material brakes which are contained in an unsealed housing. In the wet disc brake environment, the asbestos fibers are absorbed into the oil contained in the casing and do not escape to the ambient atmosphere to cause an air pollution problem.

Wet disc brakes also result in the advantages of economy of space for a given torque capacity, provide a generous lining area for friction material, and provide consistent performance in practically any operating environment.

The wet disc brake of the present invention includes several features not previously believed to have been proposed in connection with said such structures. Firstly, the discs on which the friction material is mounted are circulated in a pool of oil provided in the lower portion of the casing in which the discs are contained. These discs, which rotate with the axle, have the lower portions thereof passed through the oil bath and oil is carried by grooves and slots in the friction surfaces so that such surfaces are continually wetted. Previously, known systems have proposed that the oil be applied to the friction material by means of a spray or other injections device generally provided in the upper portion of the brake casing.

Another feature of the present brake is the provision of a spring means biasing the piston, which is provided to force the brake discs together for braking action, against the disc stack at all times preventing the piston from retracting from the discs during non-braking periods. In normal operation, there is a tendency for the piston to retract due to rotation of the brake discs. This spring pressure results in both the discs and piston being in position for immediate actuation of the brake when desired. The piston and discs do not have to move any significant distance to achieve braking action. This results in the piston and discs being self-adjusting to allow for wear and for initial manufacturing tolerances of the brake pack. This does result in a slight drag on the brakes but the energy loss and wear are insignificant.

Further, in one embodiment of the invention, the disc brake is intergrated and made an extension of a sealed housing containing oil which is provided as part of the power drive of the vehicle for which the brake is provided. Oil flows from the vehicle housing into the brake housing for the desired purposes previously enumerated. A baffle is provided between the two housings to constantly maintain a pool of oil in the brake housing regardless of tilting of the vehicle housing which may occur as the vehicle itself tilts. Such tilting could drain off all the oil from the brake housing if the baffle were not provided.

SUMMARY OF THE INVENTION

A wet disc brake is provided for a rotating member such as an axle and comprises a sealed housing which includes means for sealingly journalling the same on a rotating member. At least one first brake disc is provided including means for non-rotatably but axially slidably mounting same on the rotating member. At least one such brake disc is non-rotatably but axially slidably mounted within the housing adjacent the first brake disc. One of the brake discs has friction material adhered to in contactable relationship to the other brake disc. A piston is axially slidably mounted within the sealed housing. Fluid pressure means are associated with the housing for shifting the piston axially into pressure engagement with one of the brake discs to cause braking engagement of the disc. A pool of liquid is provided in the housing. At least a portion of the first brake disc is in contacting relationship with said pool to thereby wet said first brake disc with liquid upon rotation thereof.

IN THE DRAWINGS:

FIG. 1 is a view of a road grader for which one embodiment of the present invention has been adapted;

FIG. 2 is a view of one embodiment of a wet disc brake in accordance with the present invention with the upper portion of the brake being cut away and the lower portion of the brake having the casing removed for the purpose of clarity;

Figure 3:
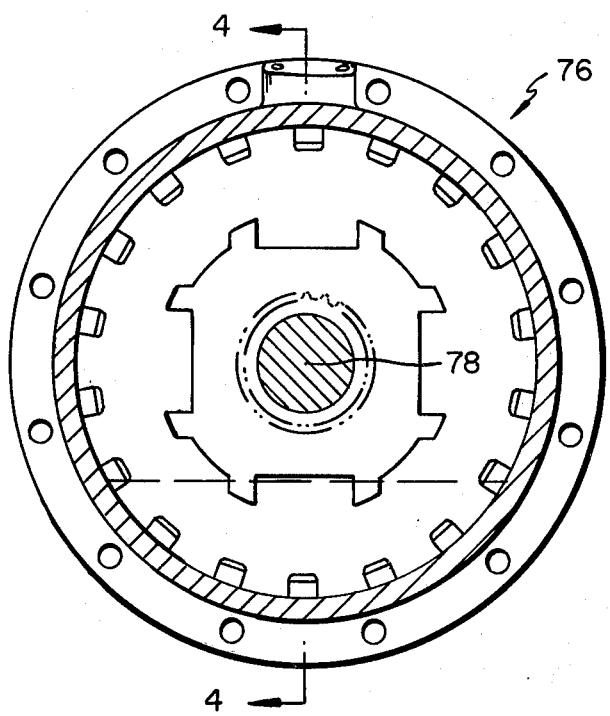
FIG. 3 is a front elevational view illustrating another embodiment of a wet disc brake in accordance with the present invention, with portions of the front casing removed, illustrating a brake structure having its own completely sealed housing.

Referring to FIG. 1, a road grader 10 is illustrated. It is this type of heavy off-the-road equipment for which the wet disc brake of the present invention is particularly suited. However, it should be appreciated that the brake may be used in conjunction with any type of vehicle or machinery when such use is deemed to be appropriate. The road grader 10 has a tandem rear drive including a pair of axle structures 12, 14. In the particular road grader 10 illustrated, both of the axle structures are driven. The axle structures are driven by means of a chain connection to a powered shaft provided between the axle structures.

The axle structure 12 is illustrated in FIG. 2. As there shown, the axle 12 is provided with a sprocket 16 within housing 18. The housing 18 extends between both axle structures 12, 14. The sprocket 16 is connected to the driving chain (not shown). Conventionally, a pool of oil 20 is provided in housing 18 for constant lubrication of the chain. Brake housing 22 is sealingly mounted on the outer portion of the housing 18 and sealingly journalled at 23 to the axle 12. The axle 12 is rotated to drive hub 24 for locomotion of the road grader 10.

It is desired to have oil flow into the brake housing 22. In order to insure that there is always oil in housing 22 regardless of the angular position of the road grader 10, a baffle 26 is provided between the two housings. In some positions of the road grader 10, as when it is on a grade, oil will flow away from the brake housing 22. The baffle 26 which is an annular disc having a central opening 28, will always retain some oil in the housing 22. The lower portion 30 of the baffle 26 functions, in effect, as a dam.

A cup-shaped retaining member 32 is provided interiorly of the housing 22. A plurality of reaction plates 36 are received on the retaining member 32. The reaction plates 36 are bare metal plates. These plates are referred to as reaction plates even though, as in the present case, they are used to apply braking pressure. These plates may be functionally reversed so as to receive braking pressure. The reaction plates 36 are ring-like members having relatively large central openings 38. The plates 36 have spaced apart peripheral lugs 40 which are received in longitudinal slots 42 provided in the sidewalls of the cup-like retaining member 32. Thus, the reaction plates 36 remain stationary along with the brake housing 22.

The stack of brake plates is composed of alternate reaction plates 36 and friction plates 44. Each friction plate 44 has a central opening 45 therethrough, the periphery of which is serrated. The axle 12 has mating peripheral serrated portions 46 over which the plates 44 are received for driving engagement with the axle with freedom to move axially. The retaining member 32 limits the axial movement of the plates in the leftward direction as viewed in FIG. 2.

Each friction plate 44 has adhered on each face thereof a ring of friction material 48, 50. The friction material is conventionally fabricated of a paper-like substance which is asbestos based. However, other friction materials may be used in conjunction with the present invention. The frictional nature of the material results in the friction rings frictionally engaging the reaction ring upon compression of the stack of rings with the result that braking action will occur to stop rotation of the axle 12.

In operation of the brake, with the vehicle in motion, the friction plates 44 are constantly rotated with the result that the friction material is continually moved through the oil 20. This serves not only to coat the friction material with oil but also tends to act as a coolant. Oil is carried upwardly by the friction material so that the entire friction material is constantly coated with oil even though portions thereof are out of contact with the pool of oil. Keeping the friction material constantly coated with oil is aided by groove structure which will be described in connection with FIGS. 5, 6 and 7. The desirability of coating the friction material with oil has been explained in the Background of the Invention.

A piston structure 52 is axially slidably mounted in housing 22. The piston structure is adapted for movement to the left as viewed in FIG. 2 to compress the stack of brake plates. Compression of the stack of plates results in the desired braking action. The piston has an annular shape including a backwall 54 from which extend longitudinal outer and inner pheripheral walls 56, 58 which define a channel shaped annular fluid chamber.

An annular fluid-feeding structure 60 is provided to supply fluid under pressure to the piston 52 to drive it leftwardly as viewed in FIG. 2. This structure, of course, also permits relief of such pressure after braking action has terminated. Structure 60 includes an annular groove 62 into which fluid under pressure is fed from port 64 or, as the case may be, relieved after the braking action has ceased. A plurality of ports 66, are annually spaced along the groove 62. Fluid under pressure passes through ports 66 into enlarged pockets 68 which extend between the peripheral walls 56, 58. Fluid under pressure is thus exerted against piston 52 when it is desired to drive the piston leftwardly as viewed in FIG. 2. Upon termination of the application of fluid under pressure, the fluid can flow reversely to relieve pressure on the piston.

An annular undulated spring plate 70 is provided on the axle 12. The spring plate 70 is formed in an undulating configuration so that some portions 72 extend in one direction while adjacent portions 74 extend in the opposite direction. As a consequence, the spring exerts a bias along the axial direction tending to position the piston 52 leftwardly as viewed in FIG. 2 so that it will always be in contact with the stack of brake plates. The spring plate 70 is initially under a slight degree of compression. With the piston bearing against the brake plate stack with a slight pressure, contact is maintained between the piston and stack of plates and between the plate themselves. This pressure contact, which is insufficient to cause braking, causes a slight drag which is not of significance in either brake wear or energy consumption.

By placing the brake discs and piston in contact, substantially instant braking action occurs when fluid under pressure is exerted against the piston. This arrangement also compensates for brake wear and initial differences in the thickness of the brake plates resulting from tolerance limitations permitted in the manufacture of the brake.

Figure 4:
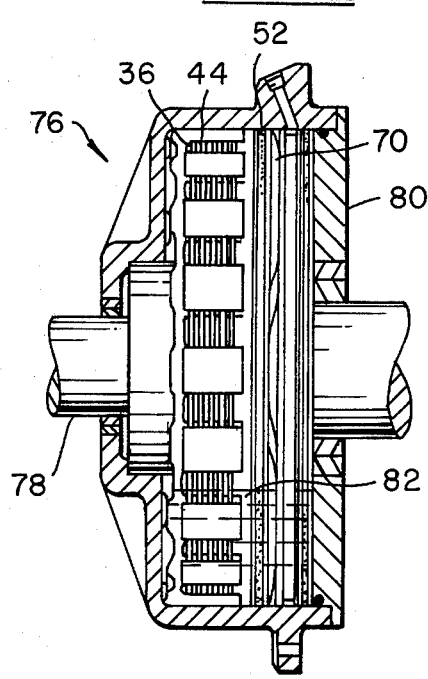
FIG. 4 is a sectional view taken substantially along the line 4—4 of FIG. 3.

Another embodiment of the brake is illustrated in FIGS. 3 and 4. The brake construction 76 is in most respects identical with that described in connection with FIG. 2. However, the brake 76 is provided as an integral unit so that it may be mounted on an axle 78 without the need for an available source of oil outside of the brake. The brake structure includes the reaction plates 36, friction plates 44, piston 52, and spring plate 70 as previously described. However, a housing plate 80 is sealingly connected to the brake housing member 22. An oil pool 82 is provided within the housing to function as previously described. Means 83, 85 are provided for sealingly journalling brake 76 onto axle 78.

Figure 5:
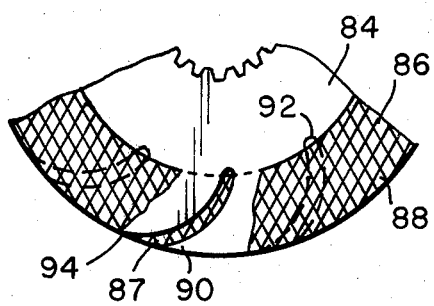
FIG. 5 is a view of a portion of a friction disc illustrating one embodiment of grooves provided in the disc for the circulation of oil over the entire brake pack.
Figure 7:
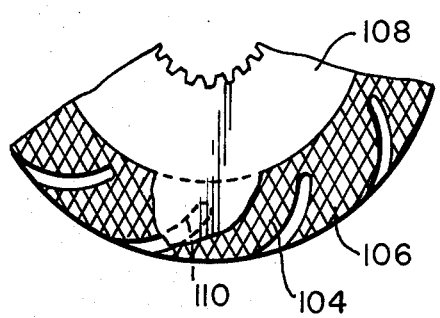
FIG. 7 is a view of a portion of a friction disc illustrating yet another embodiment of the grooves.
Figure 6:
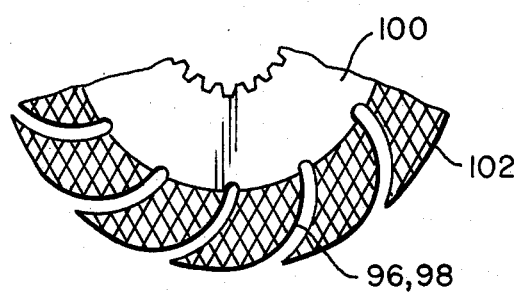
FIG. 6 is a view of the portion of a friction disc illustrating another embodiment of such grooves.

FIGS. 5, 6 and 7 illustrate various structures providing oil grooves for carrying amounts of oil with the rotating friction disc for distribution over the friction material when the friction material is out of the oil reservoir.

Referring to FIG. 5, it will be noted that the friction plate 84 has rings of friction material 86, 87 adhered on the outer peripheral marginal portions thereof. The lines 88 represent shallow indentations which are impressed into the friction material for the purpose of retaining oil as the friction plate is rotated. This is conventional structure.

Curved slots 90 are punched through the outer peripheral portion of the plate 84. The slots 90 are peripherally spaced apart and extend generally radially. They are curved in the intended direction of the disc 84, here clockwise. A portion 92 of the slots 90 extends beyond the inner periphery of friction material 86, 87. When the plate 84 is rotated, oil flows into the slots 90 via the mouth 94. It exits via the portion 92 and flows over the plate 84 and friction material 86, 87. This provides a constant source of oil application to the friction material.

FIG. 6 illustrates an embodiment in which aligned slots 96, 98 are provided in both the plate 100 and friction material 102. Again, quantities of oil are picked up in the slot formation thus provided and spill out of the slots, as the friction plate is rotated, onto and over the friction material to maintain a constant coating of oil thereon.

In FIG. 7, slots 104 are provided in the friction material 106 only. On one face of the plate while slots 110 are provided in the friction material on the opposite face of the plate, no slots are provided in the plate 108. The friction material is of sufficient thickness so that useful quantities of oil will be retained in the slots 104, 110 for flowing over the friction material after the friction material has exited from the pool of oil.

Having thus described my invention, I claim:

1. A wet disc brake for a rotating member such as an axle comprising a sealed housing including means for sealingly journalling same on said rotating member, at least one first brake disc including means for non-rotatably but axially slidably mounting same on said rotating member, at lease one second brake disc non-rotatably but axially slidably mounted within said housing adjacent said first brake disc, one of said brake discs having friction material adhered thereto in contactable relationship to the other brake disc, a piston axially slidably mounted within said housing, fluid pressure means associated with said housing for shifting the piston axially into pressure engagement with one of the brake discs to cause braking engagement of the discs, a pool of oil in said housing, at least a portion of said first brake disc in contacting relationship with said pool to thereby wet said first brake disc with oil upon rotation thereof, spring means associated with said housing constantly biasing said piston into low pressure engagement with said one brake disc to cause said one brake disc to be in low pressure engagement with said other brake disc, and a second sealed housing containing a pool of oil sealingly secured to the aforementioned sealed housing, said second sealed housing being secured to the aforementioned sealed housing in a manner for oil to flow into the aforementioned sealed housing from said second housing, and annular baffle means between said two housings to prevent flow of all of the oil contained in said aforementioned sealed housing back into said second sealed housing and from said second sealed housing back into said aforementioned sealed housing.

2. A wet disc brake as defined in claim 1, further characterized in that said friction material is adhered to said first brake disc, and a plurality of generally radially extending, peripherally spaced apart slots on the outer marginal portion of said friction material.

3. A wet disc brake as defined in claim 1, further characterized in that said friction material is adhered to said first brake disc, and a plurality of generally radially extending, peripherally spaced apart slots provided in said first brake disc which, with said friction material, define scoops.

* * * * *